(12) United States Patent
McCorkendale et al.

(10) Patent No.: US 10,122,737 B1
(45) Date of Patent: Nov. 6, 2018

(54) LOCAL AREA NETWORK ECOSYSTEM OF VERIFIED COMPUTER SECURITY RESOURCES

(71) Applicant: Symantec Corporation, Mountain View, CA (US)

(72) Inventors: Bruce McCorkendale, Manhattan Beach, CA (US); Ramakrishnan Meenakshi Sundaram, Chennai (IN)

(73) Assignee: Symantec Corporation, Mountain View, CA (US)

( * ) Notice: Subject to any disclaimer, the term of this patent is extended or adjusted under 35 U.S.C. 154(b) by 200 days.

(21) Appl. No.: 15/195,973

(22) Filed: Jun. 28, 2016

(51) Int. Cl.
  *G06F 21/00* (2013.01)
  *H04L 29/06* (2006.01)

(52) U.S. Cl.
  CPC ...... *H04L 63/1416* (2013.01); *H04L 63/0428* (2013.01); *H04L 63/1433* (2013.01); *H04L 63/1441* (2013.01)

(58) Field of Classification Search
  CPC ... H04L 63/029; H04L 63/0128; H04L 45/74; H04L 47/125; H04L 12/4633
  See application file for complete search history.

*Primary Examiner* — Ghazal B Shehni
(74) *Attorney, Agent, or Firm* — Patent Law Works LLP

(57) ABSTRACT

A router-level computer security component validates multiple endpoint computer security components on multiple endpoint devices in a local area network, based on whether given endpoints each have a specific anti-malware scanning engine and set of signatures used by the router-level component. To validate a given endpoint, the router-level component transmits a code sample which will trigger scanning by the specific anti-malware scanning engine in conjunction with a specific signature of the set, resulting in a specific detection result. In response to receiving the specific, expected detection result in return, the router-component validates the endpoint. The router-level component monitors incoming traffic in the local area network, and load balances security processing of the network traffic of each incoming data stream, based on the security capabilities of the corresponding target endpoint, and the security capabilities and available computational bandwidth of the multiple validated endpoint components and the router-level component.

20 Claims, 3 Drawing Sheets

LOCAL AREA NETWORK ECOSYSTEM OF VERIFIED COMPUTER SECURITY RESOURCES

TECHNICAL FIELD

This disclosure pertains generally to computer security, and more specifically to providing a local area network ecosystem of verified computer security resources.

BACKGROUND

As a wider variety of personal computing devices are used more extensively, contemporary home networks can include not only desktops, laptops, smartphones and tablets, but also smart appliances, wearable computing devices and other types of so-called Internet of Things (IoT) devices. With the proliferation of IoT devices and the like, the number of attack vectors in a home network is increasing. Many of these newer types of computing devices have weak security, or lack security altogether.

More specifically, the Internet of Things (IoT) refers to a network of physical objects or "things" equipped with computing hardware and software, including the ability to connect to a network and run computer instructions. Household items such as smart thermostats and appliances, as well as sensor-equipped wearable devices, are a few examples of currently popular IoT devices. New IoT devices are rapidly becoming available and adopted by household users. By the year 2017, the average number of connected devices per household is projected to grow to 25 devices, and to 50 devices by the year 2020.

IoT devices are in fact networked computing devices, albeit typically with relatively low amounts storage, memory, power supply and processing capability, and frequently with no display. Another key characteristic that most of these first generation connected IoT devices share is low security. The manufacturers of these first generation IoT devices (many of which are already on the market) tend to have little or no experience building secure software. Additionally, as time to market of new devices is a priority for manufacturers in this area, security is often neglected. As networked computing devices, IoT devices are vulnerable to malware, network attacks, data theft and the other security threats to which other networked computers are subject.

More established types of personalized computing devices in a home network such as desktops, laptops, smartphones and the like may contain security in the form of individualized endpoint applications running on the individual devices. Different ones of these devices can provide varied security capabilities, as well as differing hardware and computing resources. However, running the security capabilities and computing resources of these devices as independent endpoints limits the ability to provide robust and scalable security services for all of the devices within a personal network, such as a user's home.

It would be desirable to address these issues.

SUMMARY

Computer security processing is load balanced and shared across a local area network which includes multiple endpoint computing devices and a centralized computing device, typically in the form of a router. The endpoint computing devices can comprise a combination of desktop computers, mobile computing devices and IoT devices. Some of the endpoint devices are protected by computer security applications, whereas others are not. For example, desktop computers and mobile computing devices might be protected by endpoint computer security components, whereas IoT devices might lack such protection.

A router-level computer security component on the router validates multiple endpoint computer security components on multiple endpoint devices in the local area network. To do so, the router-level component determines whether given endpoints each have a specific anti-malware scanning engine and set of signatures. Endpoint computer security components can be validated in response to demonstrating that they have the same current anti-malware scanning engine and set of signatures used by the router-level component. More specifically, to validate a given endpoint, the router-level component transmits a code sample which will trigger scanning by the specific anti-malware scanning engine in conjunction with a specific signature of the set, resulting in a specific detection result. In response to receiving the specific, expected detection result from the given endpoint computer security component, the router-component validates the endpoint. The code sample can trigger a complicated scanning behavior, such as emulating a specific section of the code sample for a given number of instruction cycles as directed by the specific signature, such that the emulation results in unpacking or decrypting specific packed/encrypted content in the code sample. The scanning engine can then be directed by the signature to return a specific section of the unpacked/decrypted code as the detection result, such as a section of a specific size at a given offset. The router based component can encode a separate unique value in a specific location of a separate code sample for each endpoint being validated (e.g., a random number generated for the specific validation). Multiple signatures can be included in the set to direct the anti-malware scanning engine to decode the corresponding unique values in the separate code samples, and return them as detection results. Where a given endpoint computing device does not return the expected result in response to transmission of a code sample, the router-level computer security component determines that the specific anti-malware scanning engine and the set of signatures is not present on that endpoint, and does not proceed with the validation or registration. The un-validated endpoint device can be quarantined and further analyzed for potential maliciousness.

The router-level component registers multiple validated endpoint computer security components on multiple endpoint computing devices in the local area network. A service registry of computer security service capabilities of the router-level security component and each registered endpoint computer security component is maintained. The service registry can, for example, store listings of the software security and computational capabilities of each specific registered endpoint security component, as well as the router-level component. The router-level component can receive heartbeat signals from the multiple registered endpoint security components at periodic intervals, which it can use to track the liveness and status of the registered endpoint security components. The router-level component can also periodically reassess each registered endpoint security component, to determine whether each registered endpoint security component still has the specific anti-malware scanning engine and the specific set of signatures. The router-level component can perform this task by sending out a new code sample.

The router-level component monitors incoming traffic in the local area network, and load balances security processing of the network traffic. This can take the form of balancing the security processing of each incoming data stream, based on the security capabilities of the corresponding target endpoint, and the security capabilities and available computational bandwidth of the multiple registered endpoint components and the router-level component. For example, responsive to determining that a specific target endpoint of a given incoming data stream is not protected by a computer security application (e.g., in the case of an IoT device that lacks an endpoint computer security component), the threat assessment of the incoming stream can be delegated to a registered endpoint security component. On the other hand, where the target endpoint of a given incoming stream is protected by a registered endpoint security component, the router-based component can delegate the threat assessment to the registered component on the target endpoint, thereby freeing up its own bandwidth. If the target endpoint has a registered endpoint security component but lacks current computational bandwidth, the threat assessment can be delegated to a separate registered endpoint security component on a separate endpoint computing device. In addition, separate components of a single security processing task can be delegated to multiple registered endpoint security components on multiple endpoint computing devices.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
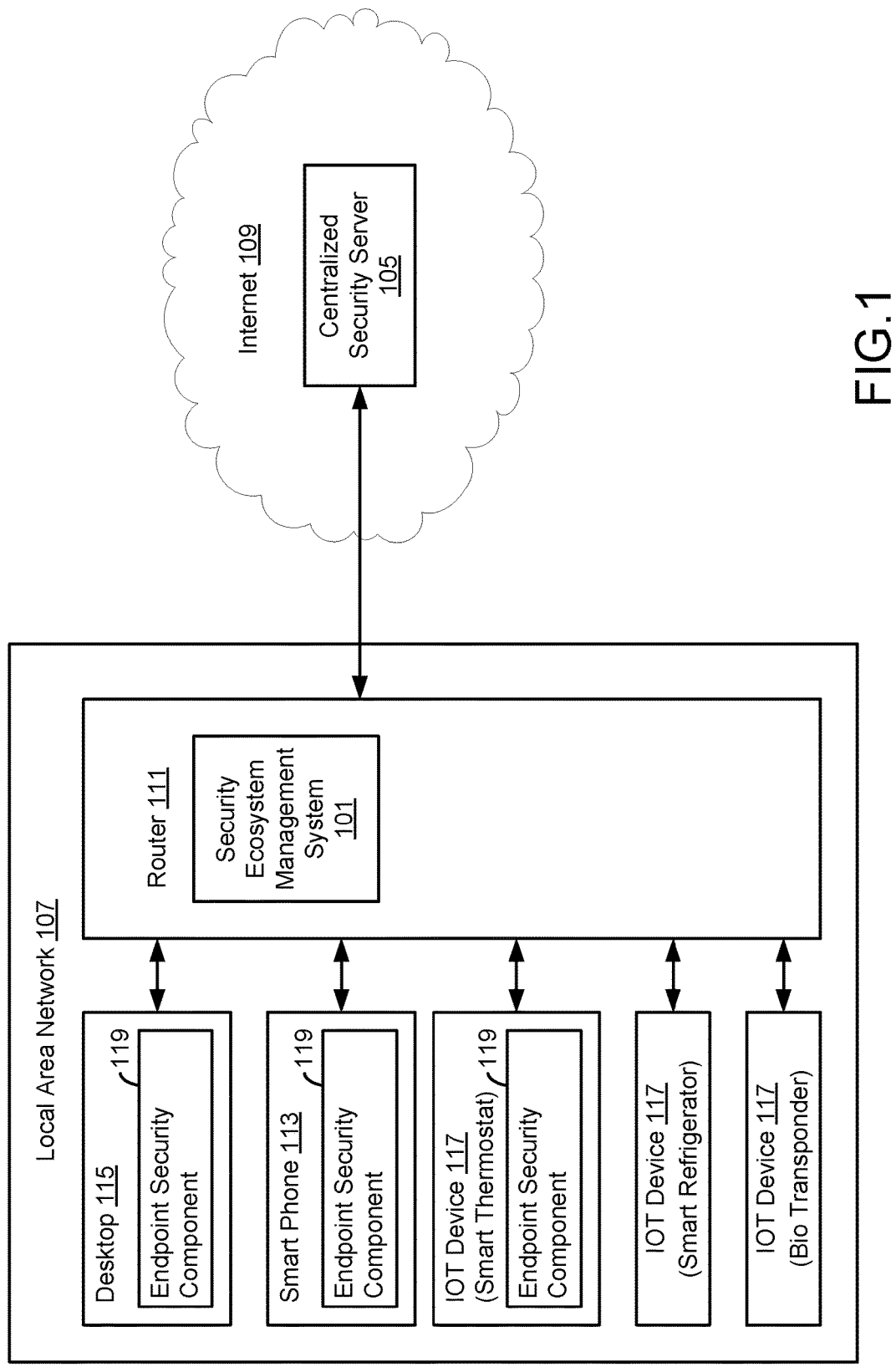
FIG. 1 is a block diagram of an exemplary network architecture in which a security ecosystem manager can be implemented, according to some embodiments.

FIG. 1 is a block diagram illustrating an exemplary network architecture in which a security ecosystem manager 101 can be implemented. The illustrated network architecture comprises a local area network 107 (for example in a home or other context). The illustrated local area network 107 comprises multiple computers 210 which are connected to a router 111, which is in turn connected the Internet 109 (or in other embodiments to a different wide area network). The computers 210 present in a local area network 107 can comprise any combination of desktop computers 115, mobile computing devices 113 and or IoT devices 117, acting in the capacity of clients 103 and/or servers 105 as desired.

A mobile computing device 113 can comprise any type of portable computer system 210 capable of connecting to a network 107 and running computer instructions. Some such mobile computing devices 113 are referred to as smartphones, although some mobile phones not so designated also have these capabilities. Tablet computers, laptop computers, hybrids, convertible laptops, smart watches, smart bracelets, other types of wearable computing devices, smart stickers and smart tiles are all examples of mobile computing devices 113.

An IoT device 117 can comprise any type of physical object containing a computing infrastructure capable of running computer instructions, connecting to a network 107 and automatically transferring data to other computing devices without requiring human-to-human or human-to-computer interaction. An example type of IoT device 117 is smart thermostats, washing machines, dryers, refrigerators and other appliances that use sensors to monitor conditions, positions, contents and/or other criteria, and responsively execute computer instructions to control their associated hardware (e.g., adjust temperature, speed, water flow, lighting, etc.), and/or transmit data to other computing devices over the network 107. Another example type is IoT devices 117 embedded within or worn by people or animals that perform automatic sensing, hardware control and/or data exchange functions (e.g., a pacemaker monitor and control implant, a transponder embedded in a farm animal or pet, a bracelet that monitors a person's heart rate, blood pressure, sleep hygiene, movements, etc.). Another example type is sensors/control units built into automobiles or other vehicles. A conventional general purpose computer such as a desktop, workstation, laptop, tablet or smart phone is typically not considered an IoT device 117. However, some contemporary mobile computing devices 113 can also be considered IoT devices 117, such as smart stickers, smart tiles, smart bracelets and other types of attachable/affixable/wearable computing devices.

In FIG. 1, the local area network 107 comprises a router 111, a desktop computer 115, one mobile computing device (a smartphone) 113, and three IoT devices 117 (a smart thermostat, a smart refrigerator, and a bio transponder embedded under the skin of, e.g., a family cat). Although in this context these devices are typically connected to the router 111 wirelessly, it is also possible for computing devices 210 in the local area network 107 to be physically coupled to the router 111, via, e.g., Ethernet. The router 111 is in turn communicatively coupled to the Internet 109 via cable, DSL through an ISP, optical fiber, etc. In practice, more or fewer computing devices 210 can be included in a local area network 107 as desired, and devices can be added to and removed from the network 107 over time, as well as come in and out of wireless range.

In FIG. 1, a security ecosystem manager 101 is illustrated as residing on a router 111, with an endpoint security component 119 residing on the desktop computer 115, the smartphone 113, and one of the IoT devices 117 (the smart thermostat). Note that two of the three IoT devices 117 (the smart refrigerator and the bio transponder) lack endpoint security components 119. It is to be understood that this is an example only, and in different embodiments various functionalities of the components of the security ecosystem manager 101 can be instantiated on other types of computers 210 and/or programmable network appliances, and can be otherwise distributed between multiple computing devices as desired.

Figure 2:
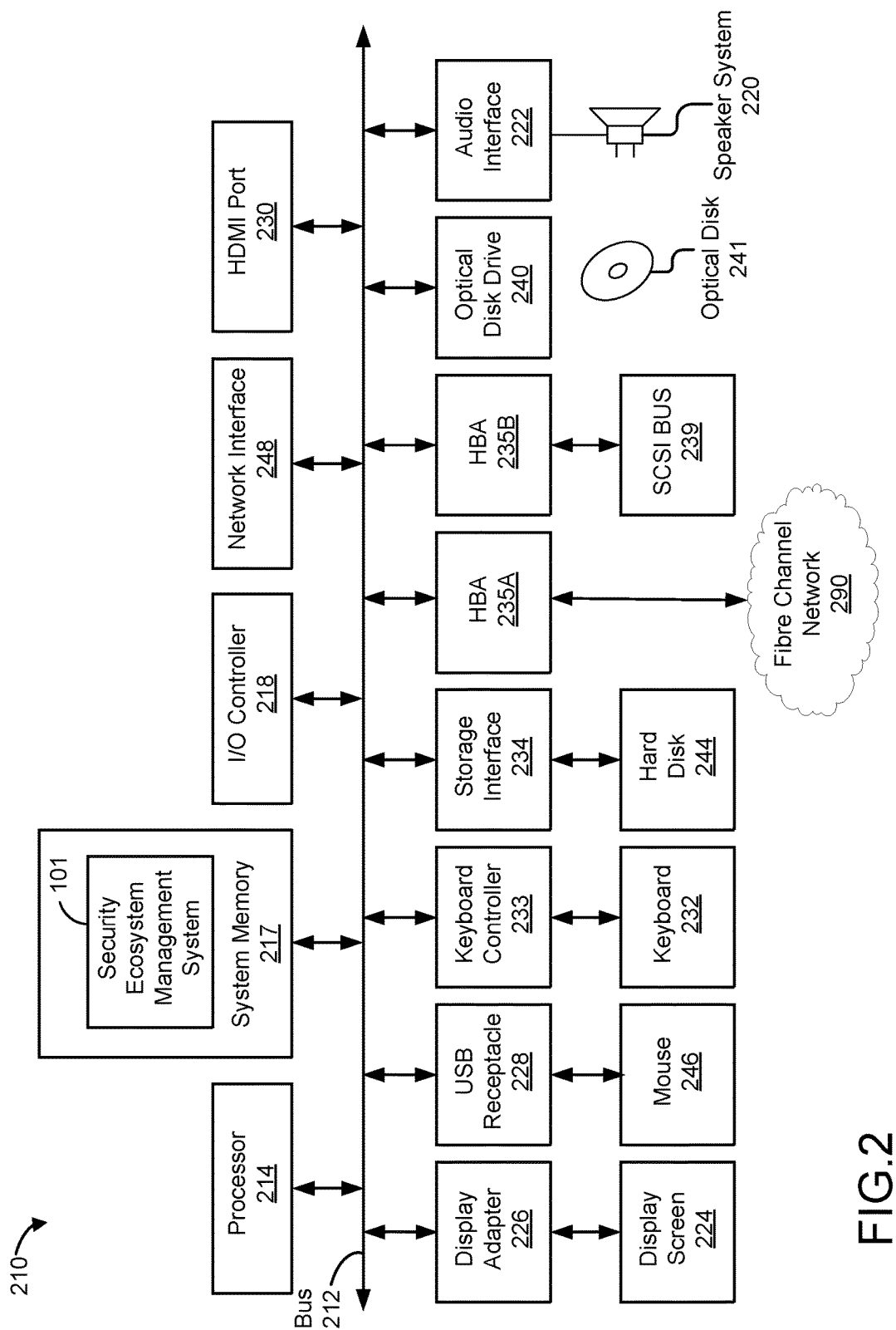
FIG. 2 is a block diagram of a computer system suitable for implementing a security ecosystem manager, according to some embodiments.

FIG. 2 is a block diagram of a computer system 210 suitable for implementing a security ecosystem manager 101 and/or an endpoint security component 119. Both desktops 115 and mobile computing devices 113 can be implemented in the form of such computer systems 210. IoT devices 117 can also be implemented in the form of such computer systems 210, although typically lacking many of the illustrated components, such as optical disk drives 240, keyboards 242, pointing devices 246 and display screens 224.

As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) receptacles 228, HDMI ports 230, etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 241, a mouse 246 (or other pointing device) coupled to the bus 212, e.g., via a USB receptacle 228, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices 113 via, e.g., USB receptacles 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 241, flash memory) and loaded into system memory 217 and executed by the processor 214. Application programs can also be loaded into system memory 217 from a remote location (i.e., a remotely located computer system 210), for example via the network interface 248. In FIG. 2, the security ecosystem manager 101 is illustrated as residing in system memory 217. The workings of the security ecosystem manager 101 are explained in greater detail below in conjunction with FIG. 3. It is to be understood that an endpoint security component 119 can also reside in system memory 217 of a computer system 210 such as the one illustrated in FIG. 2. The workings of endpoint security components 119 are also explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 can be directly or indirectly communicatively coupled to a network 107 such as the Internet 109. Mobile computing devices 113 can typically connect to wireless networks using the IEEE 802.11 standards (WiFi), and often have adapters for additional wireless communication protocols such as LTE, BlueTooth, NFC, etc. Smartphones are also typically equipped for voice communication over cellular networks.

Figure 3:
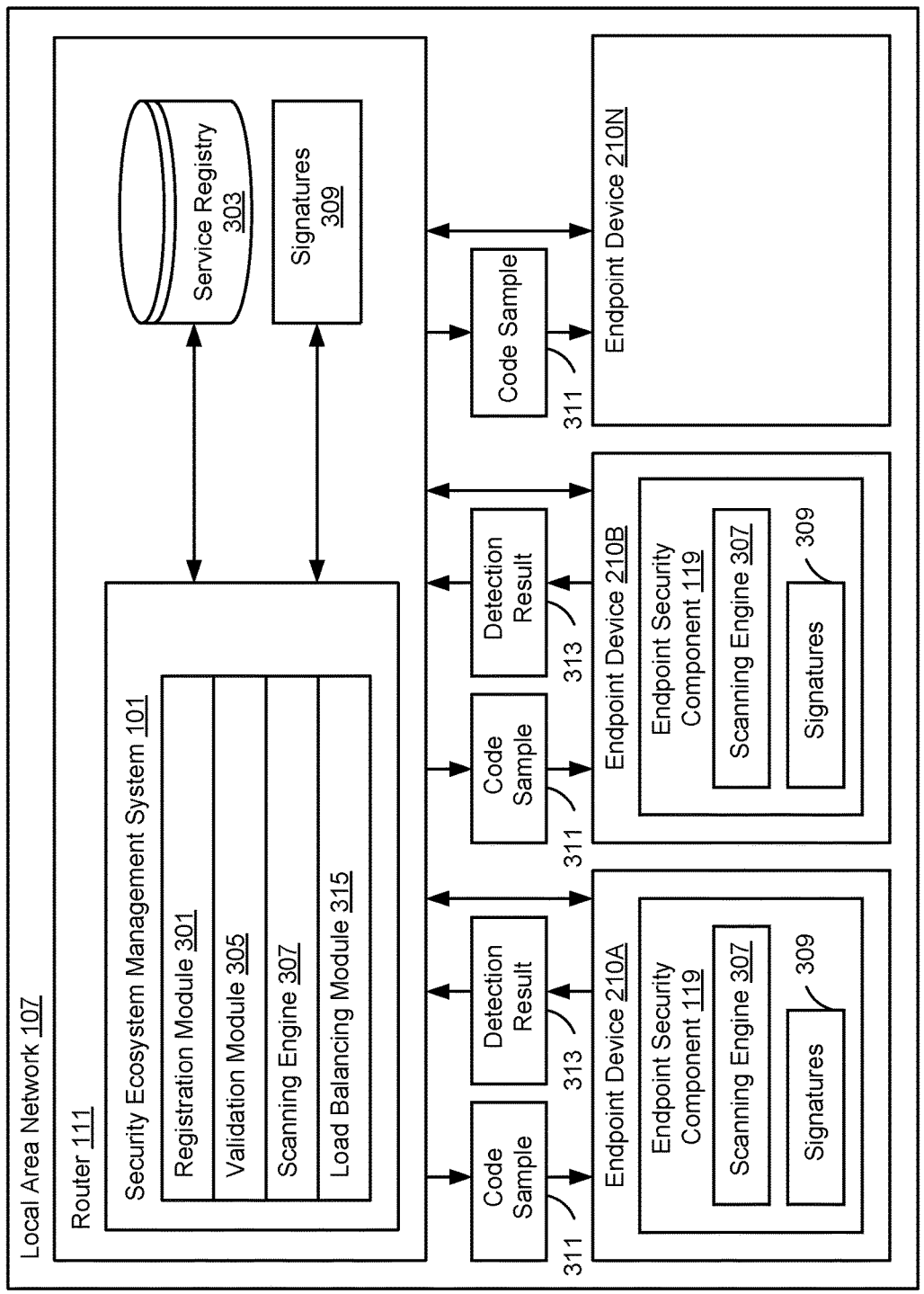
FIG. 3 is a block diagram of the operation of a security ecosystem manager, according to some embodiments.

FIG. 3 illustrates a security ecosystem manager 101 running on the router 111 of a local area network 107. The router level functionality of the security ecosystem manager 101 can be instantiated as an application running on a hardware router 111 with a configurable software component. One possible example is DD-WRT aftermarket open source routing firmware (not illustrated), which can run on top of a hardware router 111, and be configured to provide the described functionality. In other embodiments, other implementations are used to build a configurable layer of functionality that runs in conjunction with the hardware and/or software level routing components.

Routers 111 tend to be powered on 24/7, making a router 111 a suitable location for certain functions performed by the security ecosystem manager 101. In other embodiments the router level functionality of the security ecosystem manager 101 is located on other components, such as a server computer 105 that is communicatively coupled to the router 111. In addition, as described in more detail below, one or more endpoint security components 119 of the security ecosystem manager 101 run on computing devices 210 within the local area network 107, and communicate with the security ecosystem manager 101. The security ecosystem manager 101 is also typically instantiated in conjunction with network level security infrastructure such as a firewall, a network intrusion detection system (IDS), a network intrusion prevention system (NIPS), anti-malware scanning functionality, trusted platform module (TPM) services, etc. In other words, the security ecosystem manager 101 can provide a variety of computer security functionalities. The use of these functionalities in the context of the operation of the security ecosystem manager 101 is discussed in more detail below.

The endpoint security components 119 can be instantiated as computer security applications running on endpoint computing devices 210 in the local area network 107, configured to interact with the security ecosystem manager 101 as described in detail below. As endpoint level computer security applications, the endpoint security components 119 have engines for scanning files for malware (e.g., anti-malware scanning engines 307), and collections of signatures 309 for the scanning engines 307 to utilize to identify known malware. As noted above, the router level security ecosystem manager 101 has anti-malware scanning capability, and as such also has a scanning engine 307 and signatures 309. The endpoint security components 119 and the security ecosystem manager 101 can be provided by the same source (e.g., a publisher of computer software platforms), and can contain the same versions of the scanning engine 307 and signatures 309. In one embodiment, the security ecosystem manager 101 and the endpoint security components 119 can receive updated versions of the set of signatures 309 and/or scanning engine 307 as they become available, for example for a centralized security server 105 located in the cloud (illustrated in FIG. 1). The use of scanning engines 307 and signatures 309 by the endpoint security components 119 and the security ecosystem manager 101 is discussed in detail below.

As noted above, the functionalities of the security ecosystem manager 101 and the endpoint security components 119 can be implemented on other computing devices 210, or can be distributed between multiple computer systems 210, including within a cloud-based computing environment in which the functionality of the security ecosystem manager 101 is provided as a service over a network 107. It is to be understood that although the security ecosystem manager 101 and endpoint security components 119 are illustrated in FIG. 3 as standalone entities, each component of the security ecosystem manager 101 represents a collection of functionalities, which can be instantiated as a single or as multiple modules on one or more computing devices 210 as desired. FIG. 3 illustrates a specific embodiment in which the security ecosystem manager 101 is instantiated in the form of specific, multiple modules which are located on a router 111 and multiple local area network level computing devices 210. In other embodiments, the functionalities of the security ecosystem manager 101 are distributed and/or instantiated in other ways.

The modules of the security ecosystem manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the security ecosystem manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

In addition to the security ecosystem manager 101 functionality described below, the router 111 also typically supports a local area network 107, to which computing devices 210 can connect, using whatever protocols the router 111 provides. Computing devices 210 can thus access the local area network and/or Internet according to the administered configuration. In some embodiments, routers 111 contain wireless transceivers (not illustrated) for communicating to IoT devices 117 using protocols such as Z-Wave, Zigbee, Bluetooth Low Energy, 6lowpan, etc. Under some such protocols, IoT devices 117 use a mesh network to communicate with one another and a hub that communicates with all of them and presents them to the network 107 as IP devices (the hub translates between IP and these other protocols). In some embodiments, the router 111 acts as such a hub. In some embodiments, the router 111 communicates with other such hubs as well (or instead). In addition, the security ecosystem manager 101 itself can use the connectivity provided by the router 111 to communicate with components outside of the local area network 107, such as the Internet 109.

The centralized security ecosystem manager 101 running on the router 111 can validate and register multiple endpoint security components 119 on various computing devices 210 in the local area network 107. The centralized security ecosystem manager 101 can then manage the sharing and load balancing of computer security services across the local area network 107, such that computer services provided at the router level and by the multiple endpoint security components 119 in the local area network 107 can reinforce each other, and dramatically improve protection, including for those computing devices 210 that lack adequate endpoint security software of their own, such as certain IoT devices 117.

A registration module 301 of the security ecosystem manager 101 maintains a service registry 303 of the various computer security services that the router level security ecosystem manager 101 can provide, as well as those that can be provided by the various endpoint security components 119 running on computing devices 210 in the local area network 107. As described in detail below, this service registry 303 can be used for load balancing and distribution of security services and functionalities across the security ecosystem manager 101 and the multiple endpoint security components 119. Each endpoint security component 119 registers with the security ecosystem manager 101. As part of the process of registering a given endpoint security component 119, the security ecosystem manager 101 conducts a validation. This ensures that the endpoint security component is legitimate, and not malicious code attempting to spoof the registration process. In one embodiment, the validation process leverages the fact that each legitimate endpoint security component 119 has a current anti-malware scanning engine 307 and set of signatures 309. To validate a given endpoint security component 119, a validation module 305 of the security ecosystem manager 101 transmits a code sample 311 to the endpoint security component 119, which the endpoint security component 119 scans with its anti-malware scanning engine 307, as it would any incoming file. As explained in detail below, the code sample 311 is not in fact malicious code, but is configured so as to generate a specific expected detection result 313 from the scanning engine 307. If the endpoint security component 119 is legitimate, its scanning engine 307 returns the expected detection result 313, which is in turn returned by the endpoint security component 119 to the validation module 305. On the other hand, as explained in detail below, malicious code attempting to fraudulently register itself with the security ecosystem manager 101 would lack the requisite scanning engine 307 and signature set 309, and thus would not be able to generate the expected detection result 313.

The scanning of the code sample 311 and returning of the detection result 313 can be thought of as a challenge-response type proof-of-work protocol to validate a given endpoint security component 119 seeking registration with the security ecosystem manager 101. The validation module 305 sends a given code sample 311 (the challenge) to the endpoint security component 119, which per forms the work of scanning the code sample 311 and generating the expected detection result 313 (the response). The endpoint security component 119 sends the detection result 313 back to the validation module 305, which determines whether the expected response has been provided, and if so validates the endpoint security component 119. If the endpoint security component 119 is validated, the registration module 301 registers the endpoint security component 119, and adds its security capabilities to the service registry 303. This can take the form of storing a listing of the software security services the specific endpoint security component 119 can provide, as well as its hardware capabilities and configuration, etc. In this way, the registration module 301 can maintain the service registry 303 such that is stores a current listing of software security and computational capabilities of specific registered endpoint security components 119. In some embodiments, the security ecosystem manager 101 reassesses each registered endpoint security component 119 periodically, by sending a new code sample 311 to trigger a new expected detection result 313, in order to ensure that the endpoint security components 119 are not compromised, and are still running current scanning engines 307 and signatures 309.

The proof-of-work protocol performed by the validation module 305 during the registration of an endpoint security component 119 is now described in greater detail. In one embodiment, the protocol leverages capabilities of the anti-malware scanning engine 307 that are used to detect complicated obfuscation and encryption techniques employed by some malware and packers. More specifically, when a file containing malware that utilizes such obfuscation techniques executes, decryption or unpacking code decrypts or unpacks the code that actually performs the malicious activities at run time. In order to detect such threats without actually letting them execute on the target computing device 210 (which would potentially allow the malware to do harm), the signature 309 for identifying the piece of malware in question directs the scanning engine 307 to "run" (in an emulator) portions of the code that seem to be performing the decryption or unpacking. Typically this emulation is allowed to proceed for a specific number of instruction execution cycles. The number of execution cycles specified in the corresponding signature 309 is designed to allow the sample to emulate just long enough for known malicious code to be decrypted and recognized, but not to be executed. The signature 309 further specifies conditions that identify portions of code that may be decryption or unpacking code, and for how many cycles to perform the emulation. Thus, when a file being scanned matches these conditions, it triggers the emulation of the code at the identified portion, for the number of execution cycles specified by the corresponding signature 309.

The validation module 305 leverages this capability for the proof-of-work, without supplying the endpoint security component 119 being registered with an actual piece of malware. More specifically, the code sample 311 provided during the registration process is actually benign, but engineered such that it will trigger scanning in conjunction with a corresponding signature 309 included in the set, causing the anti-malware scanning engine 307 to emulate a specific section of the code sample 311, resulting in the unpacking or decryption of specific content in the code sample, and the returning of a specific, expected detection result 313. In general, when a scanning engine 307 detects malware when scanning a file in conjunction with a given signature 309, the signature 309 directs the engine to return a detection result 313 that include information concerning the detected threat, such as its name and perhaps its byte signature. A signature 309 designed to trigger the proof-of-work scan of the code sample 311 can be configured to direct the scanning engine 307 to return a fixed section of the decrypted code from the code sample 311 (e.g., the last 32 bytes). The return of the fixed section of decrypted code from the code sample 311 in turn confirms to the validation module 305 that the given endpoint security component 119 has the current scanning engine 307 and signatures 309, and hence is legitimate. Without the scanning engine 307 and signatures 309, it would be virtually impossible for an entity to know how to obtain the expected detection results 313 (e.g., to emulate a specific section of the code sample 311 resulting in decryption of another section, and then to return a specific number of bytes at a specific offset of the decrypted code).

It is to be understood that different signatures 309 in the set can be configured to return different fixed sections of the decrypted code from the code sample 311. Thus, the challenge provided by the validation module 305 to each separate registering endpoint security component 119 can be in the form of a code sample 311 containing some particular encrypted value, and crafted to trigger one of the given signatures 309. The encrypted value can be, for example, a unique random number generated separately by the validation module 305 for each challenge. The validation module 305 can encrypt/pack the value in the code sample 311 such that when decrypted by the engine 307 in conjunction with the triggering signature 309, the value appears at the location that the signature 309 directs the engine 307 to return. The registering endpoint security component 119 in turn returns the detection result 313 of the scan (which includes the expected value from the fixed section of the decrypted code) to the validation module 305. The validation module 305 compares the received detection result 313 with the value it encrypted into the code sample 311 it provided as the proof-of-work challenge. Where there is a match, the validation module validates the endpoint security component 119 and the registration is allowed to be completed.

Where the endpoint security component 119 does not return the expected detection result 313, the endpoint security component 119 is not registered with the security ecosystem manager 101. A computing device 210 that presents itself to the security ecosystem manager 101 as an endpoint security component 119 but is not able to validate through the poof-of-work is potentially a malicious application. Thus, an endpoint that fails an attempt to register with the security ecosystem manager 101 can be quarantined and further examined to determine whether it is malicious. Additional actions can also be taken as desired (e.g., blocking future communication between the router 111 and the endpoint computing device 210 that failed the proof-of-work, sending a warning notification to an administrator, etc.).

In other embodiments, malware creation/detection techniques other than decryption/unpacking can be utilized by the validation module 305 for the proof-of-work challenge. For example, in one embodiment, the validation module 305 could provide a code sample 311 with a payload consisting of a crafted TCP/IP packet, which when processed by the scanning engine 307 and corresponding signature 309 results in the return of specific content at a given offset in the packet. Put more generally, a signature 309 can be thought of as code that that is interpreted by the scanning engine 309, with the code being scanned as the input and the detection result as the output. When crafted input is provided in the form of the payload in the code sample 311, the interpretation of the corresponding signature 309 by the scanning engine 307 results in specific output, which in turn is the value expected by the validation module 305. Thus, whereas decryption/unpacking of a payload in the code sample 311 is one secure option, any function that the scanning engine 307 is able to execute is an option for such a proof-of-work challenge, such as detecting specific file formats, retrieving data from specific locations, running different types of programs, etc. Determining and returning the expected value based on the code sample 311 would be nearly impossible without the particular anti-malware scanning engine 307 and most current signatures 311, which is exactly what the validation module 305 determines whether the given endpoint security components 319 possess in order to perform the validation. Additionally, the triggering signatures 309 can be updated periodically, with the updated signatures 309 being distributed via the mechanism used to provide current signatures 309 to endpoint computers 210 generally (e.g., automatic download from a central, cloud-based security server 105).

As network traffic passes through the router 111, a conventional router based security platform would typically perform the threat assessment of incoming data streams itself. By contrast, the security ecosystem manager 101 is able to advantageously distribute this workload, while ensuring robust protection is provided for devices 210 lacking adequate security capabilities, such as IoT devices 117. The router-level security ecosystem manager 101 continuously monitors the incoming network traffic. A load balancing module 315 of the security ecosystem manager 101 assesses the security capabilities of the target endpoint 210 to which each incoming data stream is directed (e.g., the load balancing module 315 can check the service registry 303 to determine whether a registered endpoint security component 119 resides on the target endpoint device 210, and if so what its capabilities are). The load balancing module 315 can also determine the current available bandwidth of the various the registered endpoint security components 119 for executing security processing (e.g., processing and other computational resource capability and availability). The load balancing module 315 can use this information to balance the security processing of each incoming data stream in the local area network 107 between computing devices 210 as desired.

For example, where the target device 210 is adequately protected, e.g., by an endpoint security component 119, the load balancing module 315 can pass the stream directly to the endpoint 210, delegating the threat assessment to the endpoint security component 119 running thereon. This frees up the bandwidth of the router-level security ecosystem manager 101, and reduces latency. Where a stream is destined for a computing device 210 that is not protected by a computer security application (e.g., an IoT device 117 lacking an endpoint security component 119), the security ecosystem manager 101 can either execute the security processing of the stream itself, or the load balancing module 315 can offload the security processing of the stream to one of the registered endpoint security components 119. The load balancing module 315 can thus distribute the security processing workload between the router-level security ecosystem manager 101 and the collection of available endpoint security components 119. This load balancing of security processing can be based on the security capabilities of the target devices 210, the router-level security ecosystem manager 101 and the various endpoint security components 119, as well as the available computational bandwidth of the various devices 210.

The load balancing and delegation of security processing can be performed at any level of granularity. For example, the load balancing module 315 could delegate some security functions concerning a given incoming stream to the router-level security ecosystem manager 101 (e.g., intrusion detection) and delegate other security services to an endpoint security component 119 (e.g., anti-malware scanning), depending upon the capabilities and/or bandwidth of the various devices 210. The load balancing module 315 can also delegate separate components of a single security processing task to multiple endpoint security components 119. In addition, where a target device 210 is capable at a software level of performing its own security processing but lacks current bandwidth, the load balancing module 315 can delegate security processing of an incoming stream to another device 210. These are just examples of load balancing scenarios. It is to be understood that the above described functionalities enable the software and hardware resources of the router 111, the security ecosystem manager 101 and the plurality of endpoint security components 119 and their underlying computing devices 210 to be shared in a coordinated and secure manner. So that the security ecosystem manager 101 can track the liveness and status of the multiple registered endpoint security components 119, the endpoint security components 119 send heartbeat signals to the router-level security ecosystem manager 101 at periodic intervals.

In addition to the load balancing, registered endpoint security components 119 can also request any service available through the security ecosystem manager 101. As noted above, the service registry 303 documents the various security service capabilities of the router-level security ecosystem manager 101 and the participating endpoint security components 119. A registered endpoint security component 119 can consult the service registry 303, and request to make use of any services, such as TPM services (e.g., cryptographic key generation, sealed storage, etc.) made available through the security ecosystem manager 101. In response to such requests, the security ecosystem manager 101 can provide the services to registered endpoint security components 119.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for load balancing and sharing computer security processing across a local area network comprising multiple computing devices, the method comprising the steps of:
   validating multiple endpoint computer security components on multiple endpoint computing devices in the local area network, in response to determining that the multiple endpoint computing devices each have a specific anti-malware scanning engine and a specific set of signatures, by a centralized computer security component on a centralized computing device in the local area network;
   registering the multiple validated endpoint computer security components on the multiple endpoint computing devices in the local area network, by the centralized computer security component on the centralized computing device in the local area network;
   maintaining a service registry of computer security service capabilities of the centralized computer security component and each registered endpoint computer security component, by the centralized computer security component;

monitoring incoming traffic in the local area network, by the centralized computer security component; and load balancing security processing of network traffic in the local area network between the centralized computer security component and the registered endpoint computer security components, by the centralized computer security component.

2. The method of claim 1 wherein:

the centralized computing device in the local area network comprises a router.

3. The method of claim 1 wherein the local area network further comprises:

a plurality of Internet of Things (IoT) devices at least some of which lack endpoint computer security components.

4. The method of claim 1 wherein validating an endpoint computer security component on an endpoint computing device further comprises:

transmitting to the endpoint computer security component by the centralized computer security component, a code sample that triggers scanning by the specific anti-malware scanning engine in conjunction with a specific signature of the specific set of signatures, and returning a specific detection result by the specific anti-malware scanning engine;

receiving the specific detection result by the centralized computer security component from the endpoint computer security component, responsive to transmitting the code sample to the endpoint computer security component;

determining, by the centralized computer security component, that the endpoint computer security component has the specific anti-malware scanning engine and the specific signature, responsive to receiving the specific detection result from the endpoint computer security component; and validating the endpoint computer security component on the endpoint computing device, by the centralized computer security component, in responsive to determining that the endpoint computer security component has the specific anti-malware scanning engine and the specific signature.

5. The method of claim 4 wherein transmitting the code sample further comprises:

transmitting to the endpoint computer security component by the centralized computer security component, the code sample that triggers the specific anti-malware scanning engine in conjunction with the specific signature to perform the following steps:

emulating a specific section of the code sample for a specific number of instructions cycles as directed by the specific signature, the emulation resulting in unpacking or decrypting of specific packed or encrypted content in the code sample; and returning a specific section of the unpacked or decrypted code from the code sample as the detection result, the specific section of the unpacked or decrypted code being of a specific size and located at a specific offset, as directed by the specific signature.

6. The method of claim 1 further comprising:

for each separate endpoint computer security component on each separate one of the multiple endpoint computing devices which the centralized computer security component validates, encoding a separate unique value in a specific location of a separate code sample that triggers the anti-malware scanning engine in conjunction with a specific signature of the specific set of signatures to perform the following steps: decoding the corresponding encoded unique value, and returning the corresponding decoded unique value; and validating endpoint computer security components responsive to receiving corresponding decoded unique values, by the centralized computer security component.

7. The method of claim 1 further comprising:

transmitting by the centralized computer security component to a specific endpoint computing device, a code sample that triggers scanning by the specific anti-malware scanning engine in conjunction with a specific signature of the specific set of signatures, and returning by the specific anti-malware scanning engine a specific detection result;

determining, by the centralized computer security component, that the specific anti-malware scanning engine and the specific set of signatures is not present on the specific endpoint computing device, responsive to not receiving the specific detection result from the specific endpoint computing device; and not validating or registering the specific endpoint computing device by the centralized computer security component, in responsive to determining that the specific anti-malware scanning engine and the specific set of signatures is not present on the specific endpoint computing device.

8. The method of claim 7 further comprising:

quarantining the specific endpoint computing device.

9. The method of claim 1 wherein registering the multiple validated endpoint computer security components on the multiple endpoint computing devices in the local area network further comprises:

maintaining a service registry storing a listing of software security and computational capabilities of specific registered endpoint security components.

10. The method of claim 1 further comprising:

reassessing each registered endpoint security component periodically, to determine whether each registered endpoint security component still has the specific anti-malware scanning engine and the specific set of signatures, by the centralized computer security component.

11. The method of claim 1 wherein load balancing security processing of network traffic in the local area network further comprises:

balancing security processing of each incoming data stream in the local area network, based on security capabilities of a corresponding target endpoint, security capabilities and available computational bandwidth of the multiple registered endpoint security components, and security capabilities and available computational bandwidth of the centralized computer security component.

12. The method of claim 1 wherein load balancing security processing of network traffic in the local area network further comprises:

for each incoming data stream in the local area network, assessing security capabilities of a corresponding target endpoint, by the centralized computer security component; and responsive to determining that a specific target endpoint of a specific incoming data stream is not protected by a computer security application, delegating threat assessment of the specific incoming data stream to a registered endpoint security component, by the centralized computer security component.

13. The method of claim 12 wherein:
the specific target endpoint further comprises an Internet of Things (IoT) device that lack an endpoint computer security component.

14. The method of claim 1 wherein load balancing security processing of network traffic in the local area network further comprises:
for each incoming data stream in the local area network, assessing security capabilities of a corresponding target endpoint, by the centralized computer security component; and
responsive to determining that a specific target endpoint of a specific incoming data stream is protected by a registered endpoint security component, delegating threat assessment of the specific incoming data stream to the registered endpoint security component on the target endpoint, by the centralized computer security component.

15. The method of claim 1 wherein load balancing security processing of network traffic in the local area network further comprises:
for each incoming data stream in the local area network, assessing security capabilities of a corresponding target endpoint, by the centralized computer security component; and
responsive to determining that a specific target endpoint of a specific incoming data stream is protected by a registered endpoint security component but lacks computational bandwidth to perform threat assessment of the specific incoming data stream, delegating threat assessment of the specific incoming data stream to a separate registered endpoint security component on a separate endpoint computing device, by the centralized computer security component.

16. The method of claim 1 wherein load balancing security processing of network traffic in the local area network further comprises:
delegating separate components of a single security processing task to multiple registered endpoint security components on multiple endpoint computing devices, by the centralized computer security component.

17. The method of claim 1 further comprising:
receiving heartbeat signals from the multiple registered endpoint security components at periodic intervals, by the centralized computer security component; and
tracking liveness and status of the multiple registered endpoint security components, by the centralized computer security component, based on the received heartbeat signals.

18. The method of claim 1 further comprising:
in addition, registered endpoint security components can make requests to a router for services made available through the centralized computer security component, such as TPM services; and
providing services to registered endpoint security components, by the centralized computer security component, in response to the received requests.

19. At least one non-transitory computer readable-storage medium for load balancing and sharing computer security processing across a local area network comprising multiple computing devices, the at least one non-transitory computer readable-storage medium storing computer executable instructions that, when loaded into computer memory and executed by at least one processor of a computing device, cause the computing device to perform the following steps
validating multiple endpoint computer security components on multiple endpoint computing devices in the local area network, in response to determining that the multiple endpoint computing devices each have a specific anti-malware scanning engine and a specific set of signatures, by a centralized computer security component on a centralized computing device in the local area network;
registering the multiple validated endpoint computer security components on the multiple endpoint computing devices in the local area network, by the centralized computer security component on the centralized computing device in the local area network;
maintaining a service registry of computer security service capabilities of the centralized computer security component and each registered endpoint computer security component, by the centralized computer security component;
monitoring incoming traffic in the local area network, by the centralized computer security component; and
load balancing security processing of network traffic in the local area network between the centralized computer security component and the registered endpoint computer security components, by the centralized computer security component.

20. A centralized computing system for load balancing and sharing computer security processing across a local area network comprising multiple computing devices, the centralized computing system comprising:
at least one processor;
system memory;
a validation module residing in the system memory, the validation module being programmed to validate multiple endpoint computer security components on multiple endpoint computing devices in the local area network, in response to determining that the multiple endpoint computing devices each have a specific anti-malware scanning engine and a specific set of signatures;
a registration module residing in the system memory, the registration module being programmed to register the multiple validated endpoint computer security components on the multiple endpoint computing devices in the local area network, and to maintain a service registry of computer security service capabilities of the centralized computing system and each registered endpoint computer security component; and
a load balancing module residing in the system memory, the load balancing module being programmed to monitor incoming traffic in the local area network, and to load balance security processing of network traffic in the local area network between the centralized computing system and the registered endpoint computer security components.

* * * * *